(12) United States Patent
Kuwabara et al.

(10) Patent No.: US 10,286,976 B2
(45) Date of Patent: May 14, 2019

(54) SWING ARM STRUCTURE FOR SADDLE RIDING TYPE VEHICLE

(71) Applicant: HONDA MOTOR CO., LTD., Tokyo (JP)

(72) Inventors: Naoki Kuwabara, Wako (JP); Kenji Kofuji, Wako (JP); Kazuho Nakai, Wako (JP); Takafumi Irie, Wako (JP); Katsumasa Mukai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 10 days.

(21) Appl. No.: 15/263,090

(22) Filed: Sep. 12, 2016

(65) Prior Publication Data

US 2017/0088233 A1    Mar. 30, 2017

(30) Foreign Application Priority Data

Sep. 29, 2015   (JP) ................................ 2015-192017

(51) Int. Cl.
*B62K 25/28*    (2006.01)
*B62D 61/02*    (2006.01)
(Continued)

(52) U.S. Cl.
CPC ............ *B62K 25/283* (2013.01); *B62D 61/02* (2013.01); *B62K 11/02* (2013.01); *B62K 2025/047* (2013.01)

(58) Field of Classification Search
CPC .............................. B62K 11/02; B62K 25/283; B62K 2025/047; B62D 61/02
(Continued)

(56) References Cited

U.S. PATENT DOCUMENTS 4,556,119 A * 12/1985 Shiratsuchi .......... B62K 25/286
                                                    180/219
4,765,431 A    8/1988 Yoshioka
(Continued)

FOREIGN PATENT DOCUMENTS

EP    1 486 411 A2    12/2004
JP    S59-18080       1/1984
(Continued)

*Primary Examiner* — Joseph M Rocca
*Assistant Examiner* — Felicia L. Brittman
(74) *Attorney, Agent, or Firm* — Rankin, Hill & Clark LLP

(57) ABSTRACT

A swing arm structure includes pivot shafts extending in a vehicle width direction and disposed in a vehicle body frame, a pair of wall portions disposed in the vehicle width direction in the vehicle body frame, and an interposed portion disposed between the wall portions in a swing arm. The wall portions have wall portion-side pass-through portions, which receive the pivot shafts passed therethrough. The interposed portion has interposed portion-side pass-through portions formed therein at, out of both end portions in the vehicle width direction, portions facing the wall portion-side pass-through portions. The interposed portion-side pass-through portions receive the pivot shafts passed therethrough. The interposed portion has a non-pass-through portion formed therein at a middle portion in the vehicle width direction of the interposed portion. The non-pass-through portion does not receive the pivot shafts.

16 Claims, 4 Drawing Sheets

(51) Int. Cl.
*B62K 11/02* (2006.01)
*B62K 25/04* (2006.01)

(58) Field of Classification Search
USPC .......................................................... 180/227
See application file for complete search history.

(56) References Cited

U.S. PATENT DOCUMENTS

| | | | | |
|---|---|---|---|---|
| 4,809,802 A | * | 3/1989 | Seino | B62K 25/005 |
| | | | | 180/227 |
| 2015/0307155 A1 | * | 10/2015 | Ebinuma | B62K 25/283 |
| | | | | 180/226 |
| 2016/0223024 A1 | * | 8/2016 | Tanahashi | B60B 27/00 |

FOREIGN PATENT DOCUMENTS

| | | |
|---|---|---|
| JP | H02-256583 | 10/1990 |
| JP | 2009-248875 | 10/2009 |

* cited by examiner

SWING ARM STRUCTURE FOR SADDLE RIDING TYPE VEHICLE

BACKGROUND OF THE INVENTION

Field of the Invention

The present invention relates to a swing arm structure for a saddle riding type vehicle.

Description of Related Art

A configuration is known, as disclosed in Japanese Patent Laid-Open No. 2009-248875, for a swing arm structure for a saddle riding type vehicle that includes a vehicle body frame and a swing arm supported swingably in a vertical direction on the vehicle body frame. The vehicle body frame disclosed in Japanese Patent Laid-Open No. 2009-248875 includes center frame portions spaced away from each other in a vehicle width direction and an intermediate frame portion. The configuration includes a swing arm having a front end portion disposed between the center frame portions and the intermediate frame portion in the vehicle width direction, and a pivot shaft that is passed through the center frame portions, the front end portion of the swing arm, and the intermediate frame portion to extend in the vehicle width direction.

The swing arm structure further includes a nut that threadedly engages, under a condition in which the swing arm front end portion is disposed between the center frame portions and the intermediate frame portion in the vehicle width direction, an end portion of the pivot shaft that is passed through the entire width direction of the foregoing vehicle body frame elements. The swing arm structure thereby tightens the vehicle body frame (the center frame portions and the intermediate frame portion). This particular structure requires that the vehicle body frame have strength to withstand the tightening. As a result, the vehicle body frame is required to have a thicker wall and the structure additionally needs a large-sized cross member. This hampers effort to promote reduction in size and weight of the swing arm structure.

SUMMARY OF THE INVENTION

The present invention is directed toward promoting, in a swing arm structure for a saddle riding type vehicle that includes a vehicle body frame and a swing arm supported swingably in a vertical direction on the vehicle body frame, reduction in size and weight of the swing arm structure.

In accordance with the present invention, a swing arm structure for a saddle riding type vehicle, which includes a vehicle body frame and a swing arm supported vertically swingably on the vehicle body frame, the swing arm structure includes: a pivot shaft that extends in a vehicle width direction and that is disposed in the vehicle body frame; a pair of wall portions disposed in the vehicle width direction in one of the vehicle body frame and the swing arm; and an interposed portion disposed between the wall portions in the other of the vehicle body frame and the swing arm. In the swing arm structure, at least one of the wall portions has a wall portion-side pass-through portion formed therein. The wall portion-side pass-through portion receives the pivot shaft passed therethrough. The interposed portion has an interposed portion-side pass-through portion formed therein at, out of both end portions in the vehicle width direction, a portion facing the wall portion-side pass-through portion. The interposed portion-side pass-through portion receives the pivot shaft passed therethrough. The interposed portion has a non-pass-through portion formed therein at least at a middle portion in the vehicle width direction of the interposed portion. The non-pass-through portion does not receive the pivot shaft.

The non-pass-through portion, through which the pivot shaft is not passed, is formed at least in the middle in the vehicle width direction of the interposed portion. This arrangement shortens a length in the vehicle width direction of the pivot shaft to thereby achieve reduction in weight of the pivot shaft, as compared with a configuration in which the pivot shaft is passed through an entire length in the vehicle width direction of the wall portions and the interposed portion. In other words, the formation of the non-pass-through portion in the middle in the vehicle width direction of the interposed portion results in the pivot shaft being separated into the first pivot shaft and the second pivot shaft in the vehicle width direction, so that the weight can be reduced for a portion in the vehicle width direction between the first pivot shaft and the second pivot shaft (portion in which the pivot shaft is not formed), as compared with a configuration in which the pivot shaft is not separated (configuration having only one pivot shaft). Additionally, even when a nut is threadedly engaged with an end of the pivot shaft to tighten the vehicle body frame, the present configuration is not such that the pivot shaft is passed through an entire length in the vehicle width direction of the wall portions and the interposed portion, and thus the present configuration does not require that the vehicle body frame have strength to withstand the tightening. The present configuration does not require that the vehicle body frame have a thicker wall or include a large-sized cross member, either. Reduction in size and weight of the swing arm structure can thus be promoted.

In further accordance with the present invention, the wall portions are disposed in the vehicle body frame. The interposed portion is disposed in the swing arm. The interposed portion has an interposed portion-side pass-through portion forming portion in which the interposed portion-side pass-through portion is formed. The pivot shaft is rotatably supported by a bearing disposed between the pivot shaft and the interposed portion-side pass-through portion forming portion. One of an inner ring and an outer ring that constitute the bearing is fixed in one of the pivot shaft and the interposed portion-side pass-through portion forming portion. The other of the inner ring and the outer ring is fixed in the other of the pivot shaft and the interposed portion-side pass-through portion forming portion.

The bearing is thereby directly fixed to the pivot shaft and the interposed portion-side pass-through portion forming portion. This configuration can prevent the interposed portion of the swing arm from moving in the vehicle width direction with respect to the wall portions of the vehicle body frame, as compared with a configuration in which the bearing is fixed via a collar member. The length in the vehicle width direction of the wall portions can thus be shortened to thereby promote reduction in size and weight of the swing arm structure.

According to a further aspect of the present invention, the swing arm structure further includes: a nut member threadedly engageable with the pivot shaft. In the swing arm structure, the nut member is disposed in a hollow portion that forms the interposed portion-side pass-through portion in the swing arm. The inner ring is fixed through threaded engagement of the nut member with the pivot shaft. The outer ring is fixed to the interposed portion-side pass-through portion forming portion.

Thus, the pivot shaft and the nut member are housed in the hollow portion in the swing arm, so that the pivot shaft and the nut member can be protected from an external factor by the swing arm (hollow portion forming portion). Additionally, the threaded engagement of the nut member with the pivot shaft allows the inner ring to be fixed. Thus, the length in the vehicle width direction can be reduced by a margin of the threaded engagement of the nut member with the pivot shaft, so that reduction in size of the swing arm structure can be promoted. Additionally, having the hollow portion in the swing arm promotes reduction in weight of the swing arm structure.

In further accordance with the present invention, the pivot shaft includes: a first pivot shaft with which the nut member threadedly engages; and a second pivot shaft that is spaced away from the first pivot shaft in the vehicle width direction and disposed coaxially with the first pivot shaft, and with which the nut member does not threadedly engage. The wall portion-side pass-through portion includes a first wall portion-side pass-through portion formed in one of the wall portions and a second wall portion-side pass-through portion formed in the other of the wall portions. The first wall portion-side pass-through portion receives the first pivot shaft passed therethrough. The second wall portion-side pass-through portion receives the second pivot shaft passed therethrough.

For the wall portion-side pass-through portions, the first wall portion-side pass-through portion through which the first pivot shaft is passed is formed in one of the wall portions and the second wall portion-side pass-through portion through which the second pivot shaft is passed is formed in the other of the wall portions, and the nut member is not threadedly engaged with the second pivot shaft. Thus, the configuration on the side of the second wall portion-side pass-through portion can be simplified through a reduced number of parts used as compared with the configuration on the side of the first wall portion-side pass-through portion. In other words, the second wall portion-side pass-through portion is required only to serve a function as an auxiliary support portion for supplementing a support portion on the side of the first pivot shaft. Thus, as compared with a configuration in which the first wall portion-side pass-through portion is formed both on the wall portions, reduction in size and weight of the swing arm structure can be promoted.

In further accordance with the present invention, the interposed portion-side pass-through portion includes a first interposed portion-side pass-through portion and a second interposed portion-side pass-through portion. The first interposed portion-side pass-through portion is formed in, of both ends in the vehicle width direction of the interposed portion, a portion facing the first wall portion-side pass-through portion and receives the first pivot shaft passed therethrough. The second interposed portion-side pass-through portion is formed in, of the both ends in the vehicle width direction of the interposed portion, a portion facing the second wall portion-side pass-through portion, and receives the second pivot shaft passed therethrough. A gap is formed between the second wall portion-side pass-through portion and the second interposed portion-side pass-through portion in the vehicle width direction. The gap allows the interposed portion to be moved in the vehicle width direction.

The gap that allows the interposed portion to be moved in the vehicle width direction is formed between the second wall portion-side pass-through portion and the second interposed portion-side pass-through portion in the vehicle width direction. Thus, even when the movement of the interposed portion in the vehicle width direction is to be restricted on the side of the first wall portion-side pass-through portion, the gap can absorb, for example, an assembly error in the bearing and oscillation occurring in the vehicle width direction.

In further accordance with the present invention, the swing arm structure further includes: a drive shaft that transmits an output from an engine disposed anterior to the pivot shaft to a rear wheel. The drive shaft is disposed at a position at which the drive shaft crosses an axis of the pivot shaft on a side of the swing arm facing the second wall portion-side pass-through portion.

Even when the drive shaft is disposed at a position at which the drive shaft crosses the axis of the pivot shaft on the side of the swing arm facing the second wall portion-side pass-through portion, the pivot shaft is not passed through an entire length in the vehicle width direction of the wall portions and the interposed portion. The pivot shaft thus does not interfere with the drive shaft. As a result, the swing arm can be reduced in height in the vertical direction for greater reduction in size and weight. Furthermore, reduction in size and weight of the vehicle body frame for vertically swingably supporting the swing arm can be promoted.

In further accordance with the present invention, the swing arm structure further includes: a nut member threadedly engageable with the pivot shaft; and a cylindrical collar that is passed over the pivot shaft at a position opposed to the nut member across the bearing. The nut member is disposed in a hollow portion that forms the interposed portion-side pass-through portion in the swing arm. The inner ring is fixed between the nut member and the collar through threaded engagement of the nut member with the pivot shaft. The outer ring is fixed to the interposed portion-side pass-through portion forming portion.

The inner ring is fixed between the nut member and the collar through the threaded engagement of the nut member with the pivot shaft. This arrangement allows the inner ring to be rigidly fixed through enlargement of a portion of the collar in abutment with a wall portion of the vehicle body frame.

In further accordance with the present invention, the swing arm structure further includes a sealing member disposed on an outer peripheral side of the collar. The sealing member seals a space defined between an outer peripheral surface of the collar and the interposed portion-side pass-through portion forming portion.

The sealing member that seals the space defined between the outer peripheral surface of the collar and the interposed portion-side pass-through portion forming portion is disposed on the outer peripheral side of the collar. This arrangement can prevent entry of, for example, water from the space into the interposed portion-side pass-through portion (for example, the bearing and the hollow portion of the swing arm).

In further accordance with the present invention, the nut member includes: an internal thread portion threadedly engageable with the pivot shaft; a cylinder portion having an outer peripheral surface press-fitted into an inner peripheral surface of the inner ring; and an enlarged diameter portion having a diameter enlarged outwardly in a radial direction with respect to the cylinder portion and an abutment surface that abuts on a side surface in the vehicle width direction of the inner ring.

The nut member includes: the internal thread portion threadedly engageable with the pivot shaft; the cylinder portion having an outer peripheral surface press-fitted into an inner peripheral surface of the inner ring; and the enlarged diameter portion having a diameter enlarged outwardly in the radial direction with respect to the cylinder portion and an abutment surface that abuts on a side surface in the vehicle width direction of the inner ring. This configuration allows the radial position of the inner ring and the position of the inner ring in the pivot axis to be restricted, so that the inner ring can be rigidly fixed.

In further accordance with the present invention, the nut member further includes a tool engagement portion that receives a tool to be engaged therewith during threaded engagement with the pivot shaft. The interposed portion-side pass-through portion forming portion has a tool pass-through hole formed therein. The tool pass-through hole provides communication between the hollow portion and an outside and allows the tool to be passed therethrough.

The interposed portion-side pass-through portion forming portion has the tool pass-through hole formed therein. The tool pass-through hole provides communication between the hollow portion and the outside and allows the tool to be passed therethrough. During the threaded engagement of the nut member with the pivot shaft, the tool may be passed through the tool pass-through hole into the hollow portion and engaged with the tool engagement portion of the nut member, to thereby restrict rotation of the nut member about the axis of the pivot shaft. This facilitates the threaded engagement of the nut member with the pivot shaft, so that assemblability of the bearing can be enhanced.

BRIEF DESCRIPTION OF THE DRAWINGS

These and further features of the invention will be apparent with reference to the following description and drawings, wherein.

DETAILED DESCRIPTION OF THE INVENTION

A specific embodiment to which the present invention is applied will be described below with reference to the accompanying drawings. Throughout the descriptions given hereunder, expressions indicating directions including front and rear, and left and right, mean the same directions as the directions in the vehicle to be described below unless otherwise specified. Additionally, the drawings to be referred to for the descriptions given hereunder include the following arrows to indicate respective specific directions: an arrow FR indicates forward of the vehicle, an arrow LH indicates leftward of the vehicle, an arrow UP indicates upward of the vehicle, and reference symbol CL indicates the vehicle lateral centerline.

Figure 1:
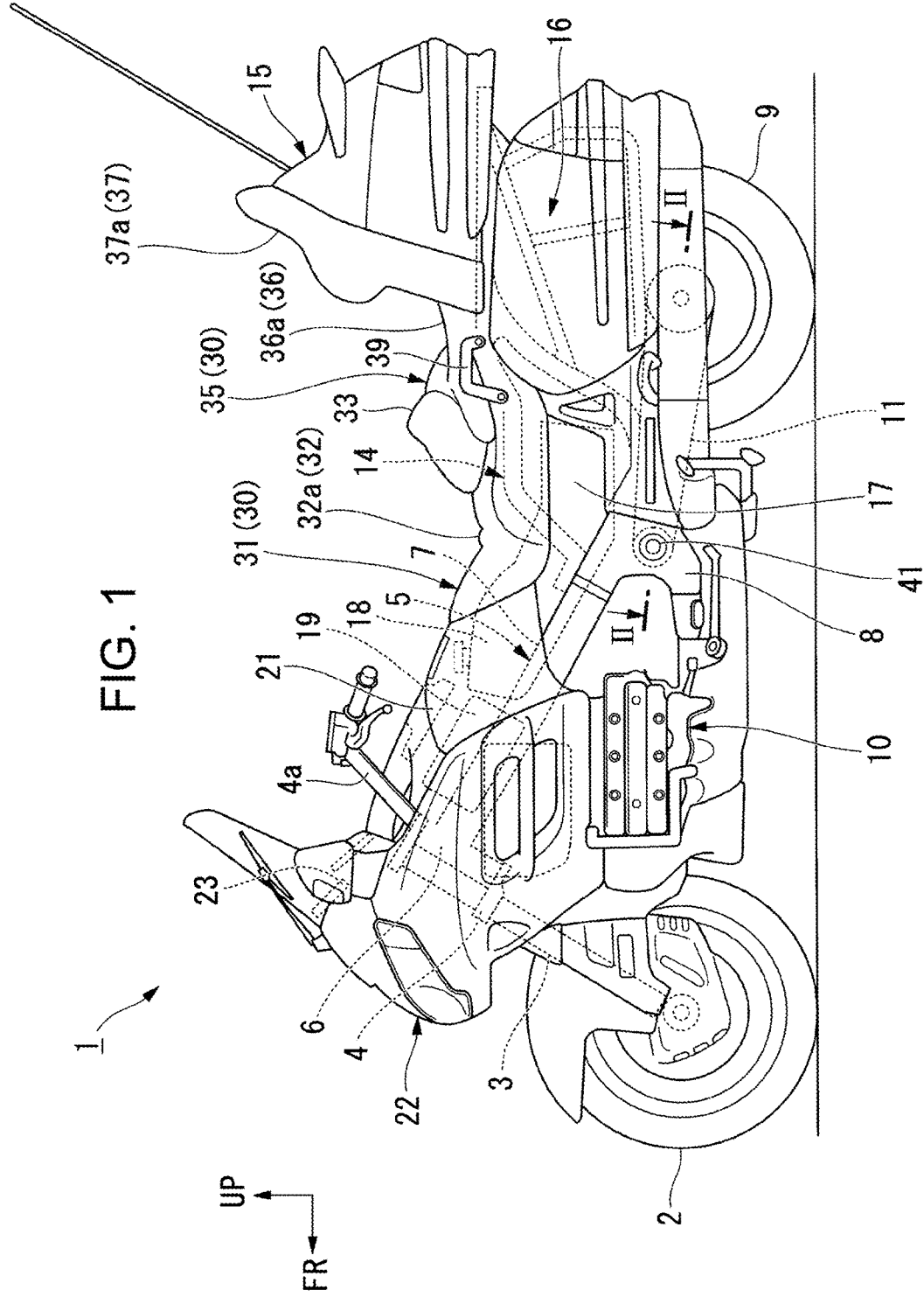
FIG. 1 is a left side elevational view showing a motorcycle according to an embodiment of the present invention.

FIG. 1 shows a motorcycle 1 as an exemplary saddle riding type vehicle. A front wheel 2 is journaled at a lower end portion of a pair of left and right front forks 3. The left and right front forks 3 have upper portions steerably supported by a head pipe 6 at a front end of a vehicle body frame 5 via a steering stem 4. A handlebar 4a for steering the front wheel is mounted above the steering stem 4.

Left and right main frames 7 extend from the head pipe 6 obliquely downwardly toward the rear. The left and right main frames 7 have rear end portions connecting to upper end portions, respectively, of left and right pivot frames 8. An engine 10 is supported at a position below the left and right main frames 7 and anterior to the left and right pivot frames 8. The engine 10 is a water-cooled, four-stroke, horizontally opposed six-cylinder engine serving as a prime mover for the motorcycle 1. It should be noted that, in FIGS. 2 to 4, reference symbol 8L denotes a left pivot frame and reference symbol 8R denotes a right pivot frame.

Figure 2:
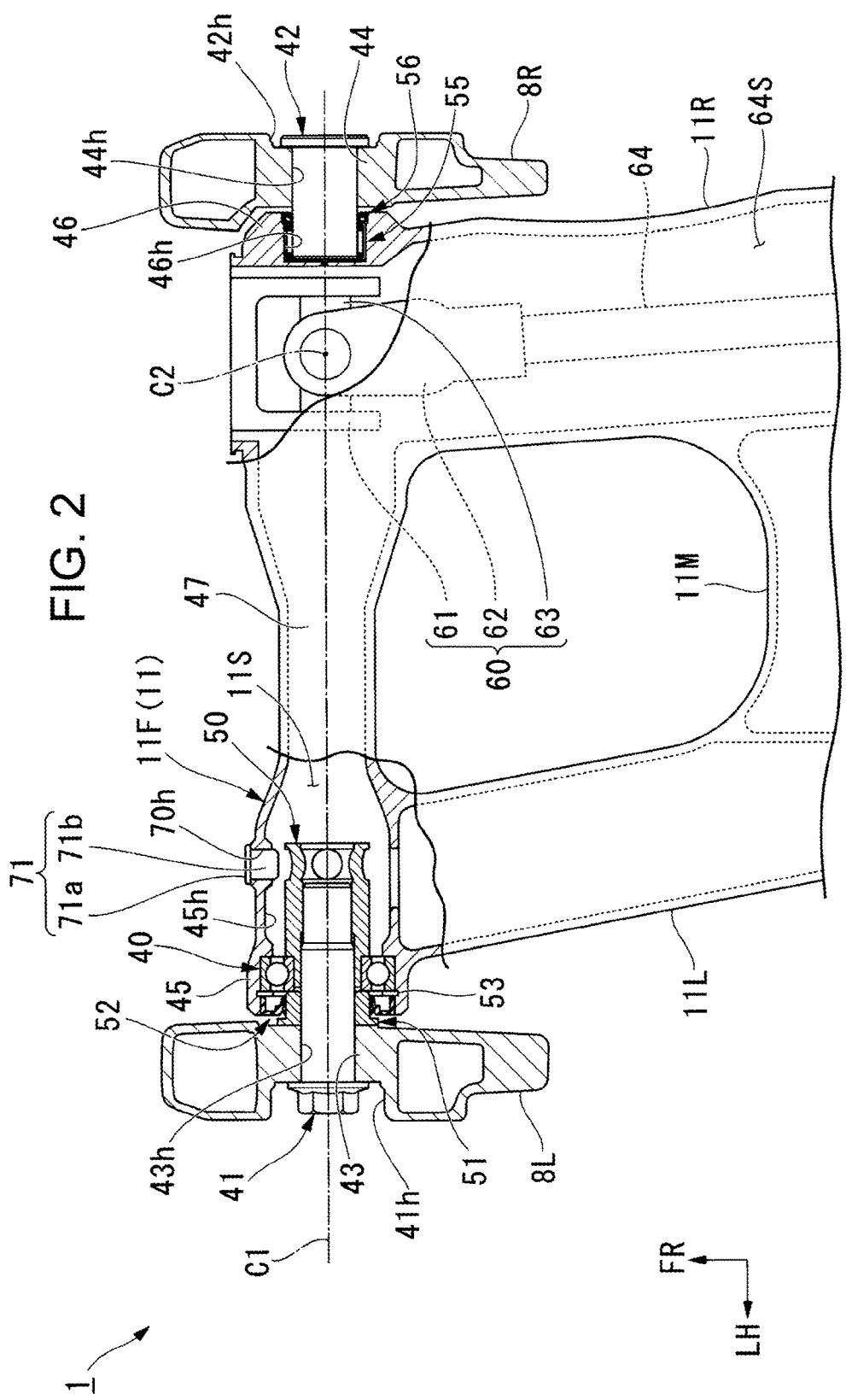
FIG. 2 is a view including a cross-sectional view taken along line II-II in FIG. 1.

With reference to FIG. 2, a swing arm 11 journals a rear wheel 9. The swing arm 11 has a front end portion 11F supported swingably in a vertical direction on the left and right pivot frames 8L and 8R. A drive shaft 64 is passed through a right arm 11R (shaft housing portion 64S) of the swing arm 11. The drive shaft 64 extends from a transmission at a rear portion of the engine 10. Power is transmitted from the engine 10 to the rear wheel 9 via, for example, the drive shaft 64.

As shown in FIG. 1, a rear frame 14 has a front end portion fixed to the left and right pivot frames 8. The rear frame 14 supports, for example, a seat 30 on which an occupant is seated. A rear trunk 15 is disposed posterior to the seat 30. Left and right saddle bags 16 are disposed on either side below a rear portion of the seat 30. In FIG. 1, reference symbol 17 denotes left and right side covers disposed on either side below a front portion of the seat 30.

A fuel tank 18 is disposed below a front portion of the seat 30 between the left and right side covers 17. The fuel tank 18 has a front portion extending up to a position anterior to the seat 30. An air cleaner box 19 for filtering engine intake air and other parts are disposed anterior to the fuel tank 18. A top shelter 21 is disposed anterior to the seat 30. The top shelter 21 covers such vehicle components as the fuel tank 18 and the air cleaner box 19 from above.

A front cowl 22 formed of a synthetic resin covers a front portion of the vehicle body of the motorcycle 1. A meter panel 23 including a speedometer and a tachometer is disposed posterior to and above the front cowl 22. The top shelter 21 is disposed at a position posterior to and obliquely below the meter panel 23 so as to join the meter panel 23.

The seat 30 integrates a front seat 31 for a rider with a rear seat 35 for a rear occupant (passenger). The front seat 31 includes a front seat main unit 32 and a backrest 33. The front seat main unit 32 forms a front seating surface 32a for the rider. The backrest 33 rises upwardly at a rear end position of the front seat main unit 32. The rear seat 35 includes a rear seat main unit 36 and a seatback 37. The rear seat main unit 36 forms a rear seating surface 36a for the rear occupant. The seatback 37 rises upwardly at a rear end position of the rear seat main unit 36 and forms a backrest surface 37a. The seatback 37 is supported by a front wall of the rear trunk 15. In FIG. 1, reference symbol 39 denotes a grip portion that the occupant can hold onto.

With reference to FIG. 2, the swing arm 11 includes the front end portion 11F, a left arm 11L, the right arm 11R, and an arm connecting portion 11M. Specifically, the front end portion 11F extends in a vehicle width direction. The left arm 11L extends rearwardly from a left side portion in the vehicle width direction of the front end portion 11F so as to be mildly inclined such that the left arm 11L is disposed more inwardly in the vehicle width direction toward the rear. The right arm 11R extends rearwardly from a right end portion in the vehicle width direction of the front end portion 11F. The arm connecting portion 11M connects the left arm 11L to the right arm 11R across the vehicle width direction.

The front end portion 11F, the left and right arms 11L and 11R, and the arm connecting portion 11M each have a hollow structure. This configuration promotes reduction in weight of the swing arm 11. In FIG. 2, reference symbol 11S denotes a hollow portion in the front end portion 11F. Reference symbol 64S denotes a shaft housing portion as a hollow portion in the right arm 11R.

The vehicle body frame 5 includes pivot shafts 41 and (first pivot shaft 41 and second pivot shaft 42) that extend in the vehicle width direction.

The first pivot shaft 41 is a bolt that extends in the vehicle width direction on the left-hand side of the vehicle.

The second pivot shaft 42 is a bolt that extends in the vehicle width direction on the right-hand side of the vehicle. The second pivot shaft 42 is spaced away from the first pivot shaft 41 in the vehicle width direction and disposed coaxially with the first pivot shaft 41. The second pivot shaft 42 has been carburized and the carburizing improves wear resistance of the second pivot shaft 42.

In FIG. 2, reference symbol C1 denotes an axis (hereinafter referred to as a "pivot axis") of the first pivot shaft 41 and the second pivot shaft 42 that are disposed coaxially with each other and extend in the vehicle width direction.

The vehicle body frame 5 includes the left and right pivot frames 8L and 8R disposed along the vehicle width direction. It should here be noted that the left and right pivot frames 8L and 8R corresponds to a "pair of wall portions" in the claims.

The front end portion 11F of the swing arm 11 is disposed between the left and right pivot frames 8L and 8R. The front end portion 11F of the swing arm 11 extends in the vehicle width direction across the left and right pivot frames 8L and 8R. It should here be noted that the front end portion 11F of the swing arm 11 corresponds to an "interposed portion" in the claims.

The left pivot frame 8L has a first wall portion-side pass-through portion 43h (wall portion-side pass-through portion) formed therein. The first pivot shaft 41 is to be passed through the first wall portion-side pass-through portion 43h. The first wall portion-side pass-through portion 43h is a through-hole that passes through the left pivot frame 8L in the vehicle width direction and through which the first pivot shaft 41 can be passed. The left pivot frame 8L has a recess 41h formed in an outer side surface in the vehicle width direction. The recess 41h is recessed inwardly in the vehicle width direction. The recess 41h in the left pivot frame 8L has a depth that is substantially equivalent to, for example, a height of a head portion of the first pivot shaft 41.

The right pivot frame 8R has a second wall portion-side pass-through portion 44h (wall portion-side pass-through portion) formed therein. The second pivot shaft 42 is to be passed through the second wall portion-side pass-through portion 44h. The second wall portion-side pass-through portion 44h is a through-hole that passes through the right pivot frame 8R in the vehicle width direction and through which the second pivot shaft 42 can be passed. The right pivot frame 8R has a recess 42h formed in an outer side surface in the vehicle width direction. The recess 42h is recessed inwardly in the vehicle width direction. The recess 42h in the right pivot frame 8R has a depth that is substantially equivalent to, for example, a height of a head portion of the second pivot shaft 42.

The left pivot frame 8L has a first wall portion-side pass-through portion forming portion 43 (wall portion-side pass-through portion forming portion) formed therein. The first wall portion-side pass-through portion 43h is to be formed in the first wall portion-side pass-through portion forming portion 43. The first wall portion-side pass-through portion forming portion 43 assumes, in the left pivot frame 8L, a wall portion having a thickness in the vehicle width direction. The first wall portion-side pass-through portion forming portion 43 has a seat on which the head portion of the first pivot shaft 41 can rest on an outer side end in the vehicle width direction and a flat surface that extends orthogonally to the pivot axis C1 on an inner side end in the vehicle width direction.

The right pivot frame 8R has a second wall portion-side pass-through portion forming portion 44 (wall portion-side pass-through portion forming portion) formed therein. The second wall portion-side pass-through portion 44h is to be formed in the second wall portion-side pass-through portion forming portion 44. The second wall portion-side pass-through portion forming portion 44 assumes, in the right pivot frame 8R, a wall portion having a thickness in the vehicle width direction substantially corresponding to the thickness of the first wall portion-side pass-through portion forming portion 43. The second wall portion-side pass-through portion forming portion 44 has a seat on which the head portion of the second pivot shaft 42 can rest on an outer side end in the vehicle width direction and a flat surface that extends orthogonally to the pivot axis C1 on an inner side end in the vehicle width direction.

Of both ends in the vehicle width direction of the front end portion 11F of the swing arm 11, a portion facing the first wall portion-side pass-through portion 43h has a first interposed portion-side pass-through portion 45h (interposed portion-side pass-through portion) formed therein. The first pivot shaft 41 is to be passed through the first interposed portion-side pass-through portion 45h. The first interposed portion-side pass-through portion 45h assumes an opening formed by opening a left end portion in the vehicle width direction of the front end portion 11F of the swing arm 11, through which the first pivot shaft 41 can be passed.

Of the both ends in the vehicle width direction of the front end portion 11F of the swing arm 11, a portion facing the second wall portion-side pass-through portion 44h has a second interposed portion-side pass-through portion 46h (interposed portion-side pass-through portion) formed therein. The second pivot shaft 42 is to be passed through the second interposed portion-side pass-through portion 46h. The second interposed portion-side pass-through portion 46h assumes an opening formed by opening a right end portion in the vehicle width direction of the front end portion 11F of the swing arm 11, through which the second pivot shaft 42 can be passed.

Of the both ends in the vehicle width direction of the front end portion 11F of the swing arm 11, the portion facing the first wall portion-side pass-through portion forming portion 43 has a first interposed portion-side pass-through portion forming portion 45 (interposed portion-side pass-through portion forming portion) formed therein. The first interposed portion-side pass-through portion 45h is to be formed in the first interposed portion-side pass-through portion forming portion 45. The first interposed portion-side pass-through portion forming portion 45 assumes, of the front end portion 11F of the swing arm 11, a cylindrical portion that opens outwardly (to the left) in the vehicle width direction. The first interposed portion-side pass-through portion forming portion 45 has an annular protrusion 45a (see FIG. 3) that protrudes inwardly in a radial direction from an inner peripheral wall of the first interposed portion-side pass-through portion forming portion 45 at a position facing an inner end in the vehicle width direction of a first bearing 40.

Figure 4:
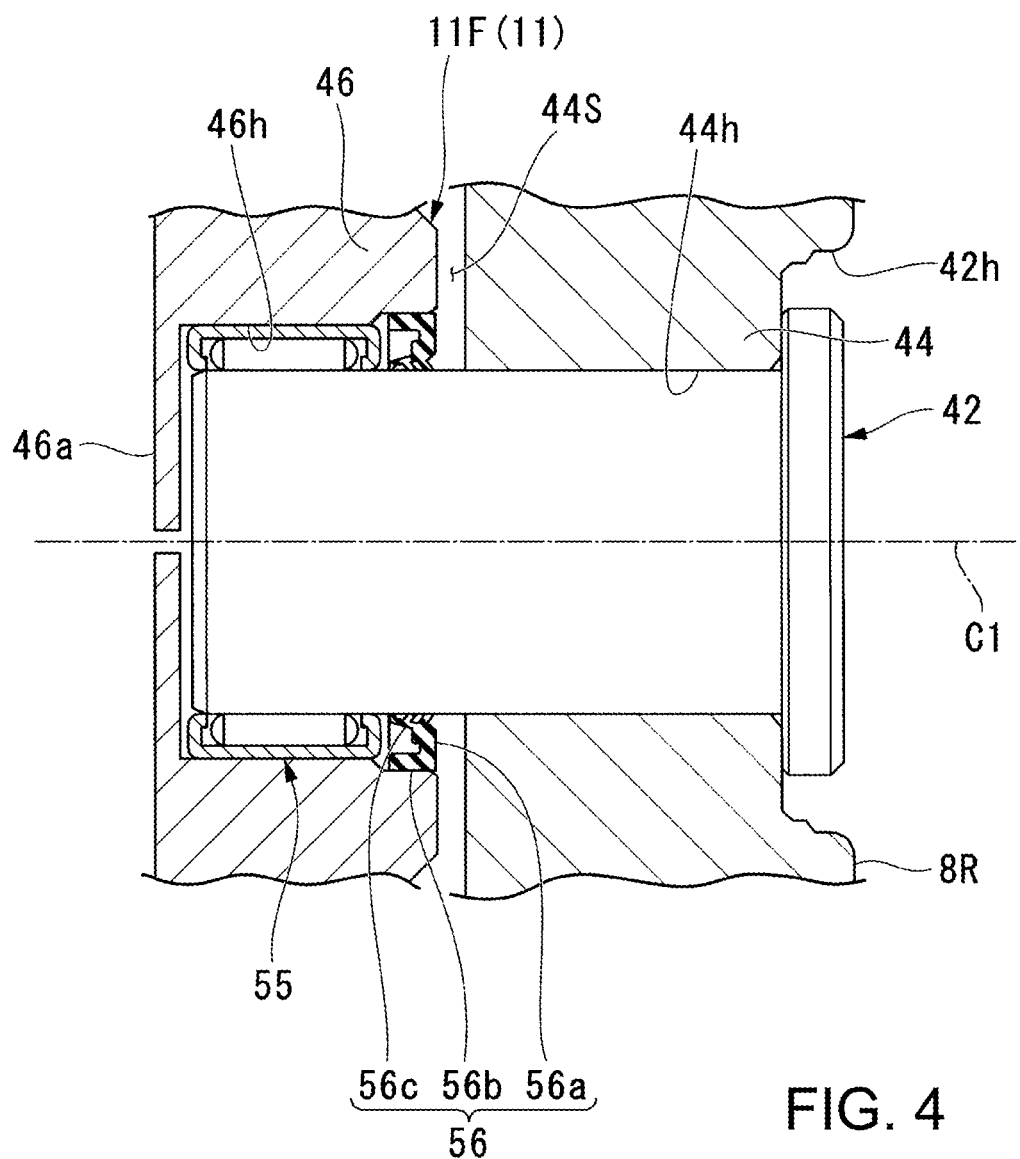
FIG. 4 is an enlarged view of main components shown in FIG. 2, showing a side of a second wall portion-side pass-through portion in the swing arm structure.

Of the both ends in the vehicle width direction of the front end portion 11F of the swing arm 11, the portion facing the second wall portion-side pass-through portion forming portion 44 has a second interposed portion-side pass-through portion forming portion 46 (interposed portion-side pass-through portion forming portion) formed therein. The second interposed portion-side pass-through portion 46h is to be formed in the second interposed portion-side pass-through portion forming portion 46. The second interposed portion-side pass-through portion forming portion 46 assumes, of the front end portion 11F of the swing arm 11, a cylindrical portion that opens outwardly (to the right) in the vehicle width direction. With reference to FIG. 4, the second interposed portion-side pass-through portion forming portion 46 has a protruding wall portion 46a that protrudes inwardly in a radial direction from an inner end in the vehicle width direction and faces a distal end (inner end in the vehicle width direction) of the second pivot shaft 42. A gap 44S is formed between the second wall portion-side pass-through portion forming portion 44 and the second interposed portion-side pass-through portion forming portion 46. The gap 44S allows the front end portion 11F of the swing arm 11 to be moved in the vehicle width direction.

With reference to FIG. 2, a non-pass-through portion 47 is formed in the middle in the vehicle width direction of the front end portion 11F of the swing arm 11. Neither the first pivot shaft 41 nor the second pivot shaft 42 is passed through the non-pass-through portion 47. In other words, the first pivot shaft 41 and the second pivot shaft 42 are separately disposed in the vehicle width direction across the non-pass-through portion 47. In the present embodiment, the non-pass-through portion 47 is hollow.

The front end portion 11F of the swing arm 11 has a hollow portion 11S formed therein. The hollow portion 11S forms the first interposed portion-side pass-through portion 45h. The hollow portion 11S assumes a space extending in the vehicle width direction inside the front end portion 11F of the swing arm 11. The hollow portion 11S forms part of the non-pass-through portion 47.

Figure 3:
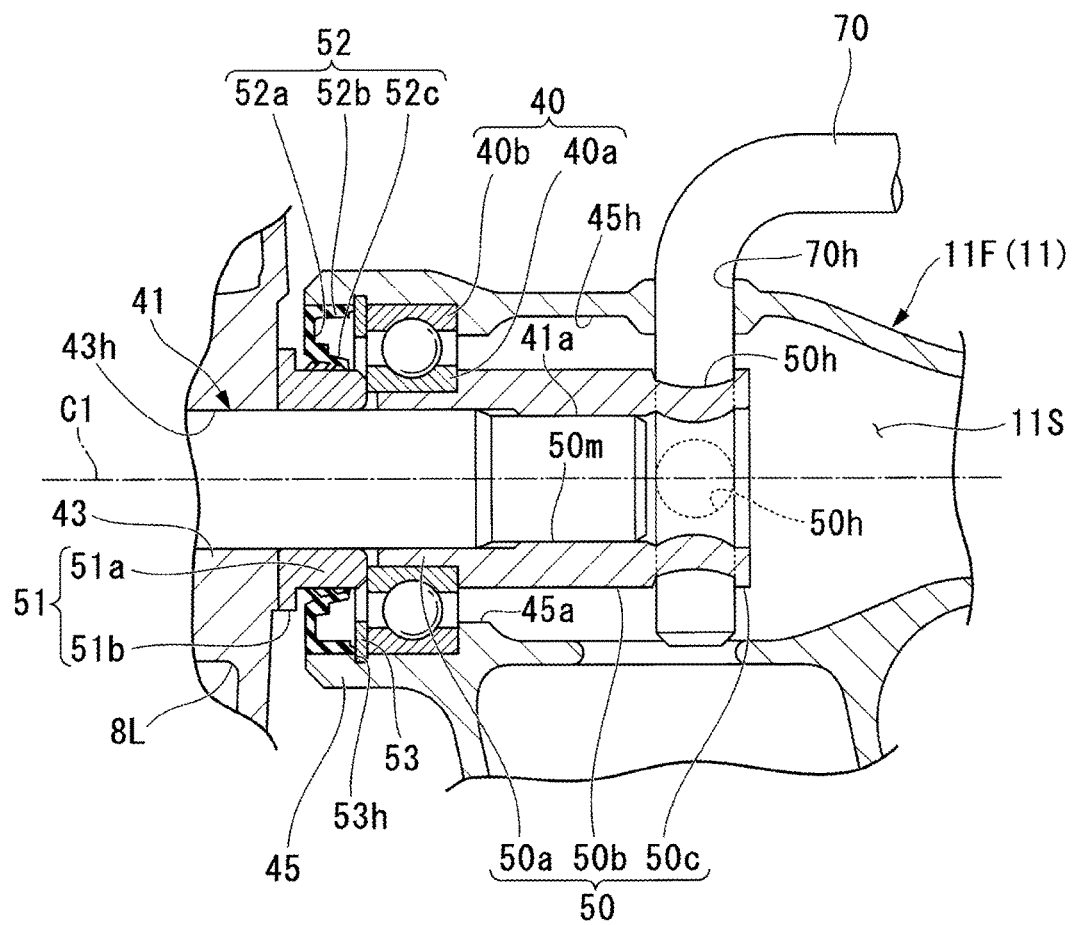
FIG. 3 is an enlarged view of main components shown in FIG. 2, showing, together with a tool, a side of a first wall portion-side pass-through portion in a swing arm structure of the motorcycle.

With reference to FIG. 3, the first bearing 40 (bearing) is disposed between the first pivot shaft 41 and the first interposed portion-side pass-through portion forming portion 45. The first bearing 40 rotatably supports the first pivot shaft 41. The first bearing 40 includes an inner ring 40a and an outer ring 40b. The first bearing 40 may be formed of, for example, a four-point contact ball bearing in which balls contact the inner ring 40a and the outer ring 40b at four points when the inner ring 40a and the outer ring 40b are pressed in a radial direction (direction orthogonal to the pivot axis C1).

The first pivot shaft 41 is provided with a nut member 50 that is threadedly engageable with the first pivot shaft 41. The nut member 50 is disposed in the hollow portion 11S in the front end portion 11F of the swing arm 11. The nut member 50, while being threadedly engaged with the first pivot shaft 41, is not threadedly engaged with the second pivot shaft 42.

The nut member 50 includes an internal thread portion 50m, a cylinder portion 50a, an enlarged diameter portion 50b, and a tool engagement portion 50c. Specifically, the internal thread portion 50m is engageable with an external thread portion of the first pivot shaft 41. The cylinder portion 50a has a cylindrical shape coaxial with the first pivot shaft 41 and an outer peripheral surface press-fitted into an inner peripheral surface of the inner ring 40a. The enlarged diameter portion 50b has a diameter enlarged outwardly in the radial direction with respect to the cylinder portion 50a and an abutment surface that abuts on an inner side surface in the vehicle width direction (a first side surface in the vehicle width direction) of the inner ring 40a. The tool engagement portion 50c receives a tool 70 to be engaged therewith during threaded engagement with the first pivot shaft 41. The tool 70 is, for example, an L-shaped pin member for locking the nut member 50.

The tool engagement portion 50c has a plurality of nut-side tool pass-through holes 50h that open in a direction orthogonal to the pivot axis C1. The nut-side tool pass-through holes 50h (four, for example, in the present embodiment) are arrayed side-by-side in a circumferential direction of the first pivot shaft 41 around the first pivot shaft 41. The nut-side tool pass-through holes 50h are disposed at a substantially identical pitch (distance between centers of two nut-side tool pass-through holes 50h adjacent to each other in the circumferential direction of the first pivot shaft 41).

The first interposed portion-side pass-through portion forming portion 45 has a tool pass-through hole 70h formed therein. The tool pass-through hole 70h provides communication between the hollow portion 11S and an outside and allows the tool 70 to be passed therethrough. The tool pass-through hole 70h passes through the first interposed portion-side pass-through portion forming portion 45 in an anterior-posterior direction at a position opposed to the tool engagement portion 50c of the nut member 50 inside the hollow portion 11S.

With reference to FIG. 2, a plug member 71 is fitted in the tool pass-through hole 70h when the tool 70 is not to be passed through the tool pass-through hole 70h (during times of the tool not being passed through). The plug member 71 includes a lid portion 71a and a boss portion 71b. Specifically, the lid portion 71a has a disc shape. The boss portion 71b is a circular column that protrudes from the back surface of the lid portion 71a and is coaxial with the tool pass-through hole 70h. The plug member 71 is formed of, for example, an elastic material such as a rubber. During times of the tool not being passed through, the boss portion 71b of the plug member 71 is elastically deformed to be fitted into the tool pass-through hole 70h.

With reference to FIG. 3, a cylindrical collar 51 is passed over the first pivot shaft 41 at a position opposed to the nut member 50 across the first bearing 40. The collar 51 includes a collar cylindrical portion 51a and a flange portion 51b. Specifically, the collar cylindrical portion 51a has a cylindrical shape coaxial with the first pivot shaft 41. The flange portion 51b has an annular shape enlarged outwardly in the radial direction to have a diameter greater than a diameter of the collar cylindrical portion 51a. The flange portion 51b has an outer side surface in the vehicle width direction abutting on an inner side end (flat surface) in the vehicle width direction of the first wall portion-side pass-through portion forming portion 43.

A sealing member 52 is disposed on the outer peripheral side of the collar 51. The sealing member 52 seals a space defined between an outer peripheral surface of the collar 51 and an inner wall surface of the first interposed portion-side pass-through portion forming portion 45. The sealing member 52 includes an annular sealing portion 52a, a seal outer wall portion 52b, and a seal inner wall portion 52c. Specifically, the annular sealing portion 52a has a circular ring shape coaxial with the first pivot shaft 41. The seal outer wall portion 52b protrudes from an outer peripheral edge of the annular sealing portion 52a so as to face an inner wall surface of the first interposed portion-side pass-through portion forming portion 45 in a direction extending along the pivot axis C1. The seal inner wall portion 52c protrudes from an inner peripheral edge of the annular sealing portion 52a so as to face an outer peripheral surface of the collar 51. The seal outer wall portion 52b is mounted on the inner wall surface of the first interposed portion-side pass-through portion forming portion 45.

A locking member 53 is disposed on the outside in the vehicle width direction of the first bearing 40. The locking member 53 locks the outer ring 40b in position to prevent the outer ring 40b from coming off position. The locking member 53 has an annular shape coaxial with the first pivot shaft 41, allowing the collar cylindrical portion 51a to pass therethrough. The locking member 53 is fitted into a groove portion 53h in the inner peripheral wall of the first interposed portion-side pass-through portion forming portion 45. The groove portion 53h is recessed outwardly in the radial direction and circumferentially from the inner peripheral wall of the first interposed portion-side pass-through portion forming portion 45 at a position facing the outer end in the vehicle width direction of the first bearing 40. The groove portion 53h is formed so deep as to allow the locking member 53 to be fitted therein.

Threadedly engaging the nut member 50 with the first pivot shaft 41 results in the inner ring 40a of the first bearing 40 being fixed between the nut member 50 and the collar 51. Specifically, an outer peripheral surface of the cylinder portion 50a of the nut member 50 is press-fitted into an inner peripheral surface of the inner ring 40a. An outer side surface (abutment surface) in the vehicle width direction of the enlarged diameter portion 50b abuts on an inner end surface in the vehicle width direction of the inner ring 40a. An outer end surface in the vehicle width direction of the inner ring 40a abuts on an inner end surface in the vehicle width direction of the collar cylindrical portion 51a.

The outer ring 40b of the first bearing 40 is fixed to the first interposed portion-side pass-through portion forming portion 45. Specifically, the inner peripheral wall of the first interposed portion-side pass-through portion forming portion 45 abuts on an outer peripheral surface of the outer ring 40b. An outer side surface in the vehicle width direction of the annular protrusion 45a abuts on an inner end surface in the vehicle width direction of the outer ring 40b. An inner side surface in the vehicle width direction of the locking member 53 abuts on an outer end surface in the vehicle width direction of the outer ring 40b.

With reference to FIG. 4, a second bearing 55 is disposed between the second pivot shaft 42 and the second interposed portion-side pass-through portion forming portion 46. The second bearing 55 rotatably supports the second pivot shaft 42. The second bearing 55 may be, for example, a needle bearing.

A sealing member 56 is disposed on the outside in the vehicle width direction of the second bearing 55. The sealing member 56 seals a space defined between an outer peripheral surface of the second pivot shaft 42 and an inner wall surface of the second interposed portion-side pass-through portion forming portion 46. The sealing member 56 includes an annular sealing portion 56a, a seal outer wall portion 56b, and a seal inner wall portion 56c. Specifically, the annular sealing portion 56a has a circular ring shape coaxial with the second pivot shaft 42. The seal outer wall portion 56b protrudes from an outer peripheral edge of the annular sealing portion 56a so as to face an inner wall surface of the second interposed portion-side pass-through portion forming portion 46 in a direction extending along the pivot axis C1. The seal inner wall portion 56c protrudes from an inner peripheral edge of the annular sealing portion 56a so as to face an outer peripheral surface of the second pivot shaft 42.

The seal outer wall portion 56b is mounted on the inner wall surface of the second interposed portion-side pass-through portion forming portion 46.

With reference to FIGS. 1 and 2, the drive shaft 64 is disposed in the shaft housing portion 64S in the right arm 11R. The drive shaft 64 transmits an output from the engine 10 disposed anterior to the first and second pivot shafts 41 and 42 to the rear wheel 9. The drive shaft 64 is disposed at a position at which the drive shaft 64 crosses the pivot axis C1 on the side of the swing arm 11 facing the second wall portion-side pass-through portion 44h.

The drive shaft 64 has a front end portion connected with an output shaft (not shown) of a transmission via a universal joint 60. The universal joint 60 is, for example, a hook joint. The universal joint 60 includes an input-side yoke 61, an output-side yoke 62, and a cross-shaped connecting shaft 63. The input-side yoke 61 is spline-connected with the output shaft. The output-side yoke 62 is spline-connected with the front end portion of the drive shaft 64. The connecting shaft 63 connects the input-side yoke 61 with the output-side yoke 62 via, for example, a roller bearing. The connecting shaft 63 has a central axis C2 disposed at a position at which the central axis C2 crosses the pivot axis C1. It should be noted that the central axis C2 of the connecting shaft 63 assumes an oscillating centerline when the output-side yoke 62 oscillates vertically with respect to the input-side yoke 61.

As described above, the swing arm structure in the present embodiment is applied to the motorcycle 1 that includes the vehicle body frame 5 and the swing arm 11 supported vertically swingably on the vehicle body frame 5. The swing arm structure includes: the pivot shafts 41 and 42 that extend in the vehicle width direction and that are disposed in the vehicle body frame 5; a pair of pivot frames 8L and 8R disposed in the vehicle width direction in the vehicle body frame 5; and the front end portion 11F disposed between the pivot frames 8L and 8R in the swing arm 11. In the swing arm structure, the pivot frames 8L and 8R have the wall portion-side pass-through portions 43h and 44h formed, respectively, therein. The wall portion-side pass-through portions 43h and 44h receive the pivot shafts 41 and 42, respectively, passed therethrough. The front end portion 11F of the swing arm 11 has the interposed portion-side pass-through portions 45h and 46h formed therein at, out of both end portions in the vehicle width direction, the portions facing the wall portion-side pass-through portions 43h and 44h. The interposed portion-side pass-through portions 45h and 46h receive the pivot shafts 41 and 42, respectively, passed therethrough. The front end portion 11F has the non-pass-through portion 47 formed therein at a middle portion in the vehicle width direction of the front end portion 11F. The non-pass-through portion 47 does not receive the pivot shafts 41 and 42.

The foregoing configurations result in the non-pass-through portion 47, through which the pivot shafts 41 and 42 are not passed, being formed in the middle in the vehicle width direction of the front end portion 11F of the swing arm 11. This arrangement shortens a length in the vehicle width direction of the pivot shafts 41 and 42 to thereby achieve reduction in weight of the pivot shafts 41 and 42, as compared with a configuration in which the pivot shaft is passed through an entire length in the vehicle width direction of the pivot frames 8L and 8R and the front end portion 11F of the swing arm 11. In other words, the formation of the non-pass-through portion 47 in the middle in the vehicle width direction of the front end portion 11F of the swing arm 11 results in the pivot shafts 41 and 42 being separated into the first pivot shaft 41 and the second pivot shaft 42 in the vehicle width direction, so that the weight can be reduced for a portion in the vehicle width direction between the first pivot shaft 41 and the second pivot shaft 42 (portion in which the pivot shafts 41 and 42 are not formed), as compared with a configuration in which the pivot shaft is not separated (configuration having only one pivot shaft). Additionally, even when a nut is threadedly engaged with an end of the pivot shafts 41 and 42 to tighten the vehicle body frame 5, the present configuration is not such that the pivot shaft is passed through an entire length in the vehicle width direction of the pivot frames 8L and 8R and the front end portion 11F of the swing arm 11, and thus the present configuration does not require that the vehicle body frame 5 have strength to withstand the tightening. The present configuration does not require that the vehicle body frame 5 have a thicker wall or include a large-sized cross member, either. Reduction in size and weight of the swing arm structure can thus be promoted.

Additionally, in the present embodiment, the inner ring 40a of the first bearing 40 is fixed to the first pivot shaft 41 and the outer ring 40b of the first bearing 40 is fixed to the first interposed portion-side pass-through portion forming portion 45. The first bearing 40 is thereby directly fixed to the first pivot shaft 41 and the first interposed portion-side pass-through portion forming portion 45. This configuration can prevent the front end portion 11F of the swing arm 11 from moving in the vehicle width direction with respect to the pivot frames 8L and 8R of the vehicle body frame 5, as compared with a configuration in which the first bearing 40 is fixed via a collar member. The length in the vehicle width direction of the pivot frames 8L and 8R can thus be shortened to thereby promote reduction in size and weight of the swing arm structure.

Additionally, in the present embodiment, the nut member 50 is disposed in the hollow portion 11S that forms the first interposed portion-side pass-through portion 45h in the swing arm 11. Thus, the first pivot shaft 41 and the nut member 50 are housed in the hollow portion 11S in the swing arm 11, so that the first pivot shaft 41 and the nut member 50 can be protected from an external factor by the swing arm 11 (hollow portion forming portion). Additionally, the threaded engagement of the nut member 50 with the first pivot shaft 41 allows the inner ring 40a to be fixed. Thus, the length in the vehicle width direction can be reduced by a margin of the threaded engagement of the nut member 50 with the first pivot shaft 41, so that reduction in size of the swing arm structure can be promoted. Additionally, having the hollow portion 11S in the swing arm 11 promotes reduction in weight of the swing arm structure.

Additionally, in the present embodiment, for the wall portion-side pass-through portions 43h and 44h, the first wall portion-side pass-through portion 43h through which the first pivot shaft 41 is passed is formed in the left pivot frame 8L and the second wall portion-side pass-through portion 44h through which the second pivot shaft 42 is passed is formed in the right pivot frame 8R, and the nut member 50 is not threadedly engaged with the second pivot shaft 42. Thus, the configuration on the side of the second wall portion-side pass-through portion 44h can be simplified through a reduced number of parts used as compared with the configuration on the side of the first wall portion-side pass-through portion 43h. In other words, the second wall portion-side pass-through portion 44h is required only to serve a function as an auxiliary support portion for supplementing a support portion on the side of the first pivot shaft 41. Thus, as compared with a configuration in which the first wall portion-side pass-through portion 43h is formed both on the pivot frames 8L and 8R, reduction in size and weight of the swing arm structure can be promoted.

Additionally, in the present embodiment, the gap 44S that allows the front end portion 11F of the swing arm 11 to be moved in the vehicle width direction is formed between the second wall portion-side pass-through portion 44h and the second interposed portion-side pass-through portion 46h in the vehicle width direction. Thus, even when the movement of the front end portion 11F of the swing arm 11 in the vehicle width direction is to be restricted on the side of the first wall portion-side pass-through portion 43h, the gap 44S can absorb, for example, an assembly error in the bearings 40 and 55 and oscillation occurring in the vehicle width direction.

Additionally, in the present embodiment, even when the drive shaft 64 is disposed at a position at which the drive shaft 64 crosses the pivot axis C1 on the side of the swing arm 11 facing the second wall portion-side pass-through portion 44h, the pivot shafts 41 and 42 are not passed through an entire length in the vehicle width direction of the pivot frames 8L and 8R and the front end portion 11F of the swing arm 11. The pivot shafts 41 and 42 thus do not interfere with the drive shaft 64. As a result, the swing arm 11 can be reduced in height in the vertical direction for greater reduction in size and weight. Furthermore, reduction in size and weight of the vehicle body frame 5 for swingably supporting the swing arm 11 can be promoted.

Additionally, in the present embodiment, the inner ring 40a is fixed between the nut member 50 and the collar 51 through the threaded engagement of the nut member 50 with the first pivot shaft 41. This arrangement allows the inner ring 40a to be rigidly fixed through enlargement of a portion (for example, the flange portion 51) of the collar 51 in abutment with a wall portion (for example, the first wall portion-side pass-through portion forming portion 43) of the vehicle body frame 5.

Additionally, in the present embodiment, the sealing member 52 that seals the space defined between the outer peripheral surface of the collar 51 and the first interposed portion-side pass-through portion forming portion 45 is disposed on the outer peripheral side of the collar 51. This arrangement can prevent entry of, for example, water from the space into the first interposed portion-side pass-through portion 45h (for example, the first bearing 40 and the hollow portion 11S of the swing arm 11).

Additionally, in the present embodiment, the nut member 50 includes: the internal thread portion 50m threadedly engageable with the first pivot shaft 41; the cylinder portion 50a having an outer peripheral surface press-fitted into an inner peripheral surface of the inner ring 40a; and the enlarged diameter portion 50b having a diameter enlarged outwardly in the radial direction with respect to the cylinder portion 50a and an abutment surface that abuts on an inner side surface in the vehicle width direction of the inner ring 40a. This configuration allows the radial position of the inner ring 40a and the position of the inner ring 40a in the pivot axis C1 to be restricted, so that the inner ring 40a can be rigidly fixed.

Additionally, in the present embodiment, the first interposed portion-side pass-through portion forming portion 45 has the tool pass-through hole 70h formed therein. The tool pass-through hole 70h provides communication between the hollow portion 11S and the outside and allows the tool 70 to be passed therethrough. During the threaded engagement of the nut member 50 with the first pivot shaft 41, the tool 70 may be passed through the tool pass-through hole 70h into the hollow portion 11S and engaged with the tool engagement portion 50c of the nut member 50, to thereby restrict rotation of the nut member 50 about the axis of the first pivot shaft 41. This facilitates the threaded engagement of the nut member 50 with the first pivot shaft 41, so that assemblability of the first bearing 40 can be enhanced.

It should be noted that the present embodiment has been exemplarily described for the configuration in which the vehicle body frame 5 includes the pivot frames 8L and 8R that serve as a pair of wall portions disposed in the vehicle width direction and the swing arm 11 includes the front end portion 11F as the interposed portion disposed between the pivot frames 8L and 8R. This is, however, not the only possible configuration. For example, the swing arm 11 may include a pair of wall portions disposed in the vehicle width direction and the vehicle body frame 5 may include an interposed portion disposed between the wall portions. Specifically, the configuration is only required such that the wall portions disposed in the vehicle width direction are disposed in one of the vehicle body frame 5 and the swing arm 11 and the interposed portion disposed between the wall portions is disposed in the other of the vehicle body frame 5 and the swing arm 11.

Additionally, the present embodiment has been exemplarily described for the configuration in which the pivot frames 8L and 8R have the wall portion-side pass-through portions 43h and 44h formed, respectively, therein, through which the pivot shafts 41 and 42 are passed, respectively. This is, however, not the only possible configuration. The configuration may, for example, be such that either one of the pivot frames 8L and 8R has the wall portion-side pass-through portion formed therein, through which the pivot shaft is passed. Specifically, at least one of the pivot frames 8L and 8R is required to have a wall portion-side pass-through portion 43h or 44h formed therein, through which the pivot shaft 41 or 42 is passed.

Additionally, the present embodiment has been exemplarily described for the configuration in which the front end portion 11F of the swing arm 11 has the non-pass-through portion 47, through which the pivot shafts 41 and 42 are not passed, formed therein in the middle in the vehicle width direction of the front end portion 11F. This is, however, not the only possible configuration. For example, the non-pass-through portion may be formed also in one end and the other end in the vehicle width direction of the front end portion 11F of the swing arm 11, in addition to the middle portion in the vehicle width direction of the front end portion 11F of the swing arm 11. Specifically, the configuration is only required such that the non-pass-through portion 47, through which the pivot shafts 41 and 42 are not passed, is formed at least in the middle in the vehicle width direction of the front end portion 11F of the swing arm 11.

Additionally, the present embodiment has been exemplarily described for the configuration in which the inner ring 40a of the first bearing 40 is fixed to the first pivot shaft 41 and the outer ring 40b of the first bearing 40 is fixed to the first interposed portion-side pass-through portion forming portion 45. This is, however, not the only possible configuration. For example, the inner ring 40a of the first bearing 40 may be fixed to the first interposed portion-side pass-through portion forming portion 45 and the outer ring 40b of the first bearing 40 may be fixed to the first pivot shaft 41. Specifically, the configuration is only required such that one of the inner ring 40a and the outer ring 40b that constitute the first bearing 40 is fixed to one of the first pivot shaft 41 and the first interposed portion-side pass-through portion forming portion 45 and that the other of the inner ring 40a and the outer ring 40b is fixed to the other of the first pivot shaft 41 and the first interposed portion-side pass-through portion forming portion 45.

Additionally, the present embodiment has been exemplarily described for the configuration in which the left pivot frame 8L has the first wall portion-side pass-through portion 43h, through which the first pivot shaft 41 is passed, formed therein and the right pivot frame 8R has the second wall portion-side pass-through portion 44h, through which the second pivot shaft 42 is passed, formed therein. This is, however, not the only possible configuration. For example, the first wall portion-side pass-through portion 43h may be formed in both of the pivot frames 8L and 8R.

Additionally, the present embodiment has been exemplarily described for the configuration in which the tool engagement portion 50c has four nut-side tool pass-through holes 50h. This is, however, not the only possible configuration. For example, any number of nut-side tool pass-through holes 50h may be set as appropriate depending on engineering specifications. Having a plurality of nut-side tool pass-through holes 50h enhances assemblability of the first bearing 40, as compared with a configuration having only one nut-side tool pass-through hole 50h, for the following reason. During the threaded engagement of the nut member 50 with the first pivot shaft 41, the tool 70 is passed through the tool pass-through hole 70h into the hollow portion 11S to be more readily engaged with the tool engagement portion 50c of the nut member 50 (specifically, to pass the tool 70 through the nut-side tool pass-through hole 50h).

The foregoing description of the preferred embodiment of the present invention is intended as illustrative only, and not limiting. For example, the saddle riding type vehicle includes common types of vehicles in which a rider straddles the vehicle body to ride, including not only motorcycles (including motorized bicycles and scooter type vehicles) but also three-wheeled vehicles (including vehicles with one front wheel and two rear wheels and vehicles with two front wheels and one rear wheel).

The present invention may also be applied to vehicles on which a longitudinal engine other than the horizontally opposed engine is mounted and vehicles on which a transverse engine including a crankshaft extending in the vehicle width direction is mounted.

It should be understood that the configurations in the embodiment described above are for illustrative purposes only and that various modifications or changes may be made without departing from the spirit and scope of the present invention including part of the components of the embodiment being replaced with known components.

REFERENCE NUMBERS

1 Motorcycle (saddle riding type vehicle)
5 Vehicle body frame
9 Rear wheel
10 Engine
8L Left pivot frame (one wall portion)
8R Right pivot frame (the other wall portion)
11 Swing arm
11F Front end portion of swing arm (interposed portion)
11S Hollow portion
40 First bearing (bearing)
40a Inner ring
40b Outer ring
41 First pivot shaft (pivot shaft)
42 Second pivot shaft (pivot shaft)

43h First wall portion-side pass-through portion (wall portion-side pass-through portion)
44h Second wall portion-side pass-through portion (wall portion-side pass-through portion)
45 First interposed portion-side pass-through portion forming portion (interposed portion-side pass-through portion forming portion)
45h First interposed portion-side pass-through portion (interposed portion-side pass-through portion)
46 Second interposed portion-side pass-through portion forming portion (interposed portion-side pass-through portion forming portion)
46h Second interposed portion-side pass-through portion (interposed portion-side pass-through portion)
47 Non-pass-through portion
50 Nut member
50a Cylinder portion
50b Enlarged diameter portion
50c Tool engagement portion
50m Internal thread portion
51 Collar
52 Sealing member
64 Drive shaft
70 Tool
70h Tool pass-through hole
C1 Pivot axis

What is claimed is:

1. A swing arm structure for a saddle riding vehicle, the saddle riding vehicle including a vehicle body frame and a swing arm supported vertically swingably on the vehicle body frame, the swing arm structure comprising:
a pivot shaft disposed in the vehicle body frame, the pivot shaft extending in a vehicle width direction;
a pair of wall portions disposed in the vehicle width direction in one of the vehicle body frame and the swing arm; and
an interposed portion disposed between the wall portions in the other of the vehicle body frame and the swing arm, wherein
at least one of the wall portions has a wall portion-side pass-through portion formed therein, the wall portion-side pass-through portion receiving the pivot shaft passed therethrough,
wherein an end portion of the interposed portion in the vehicle width direction has an interposed portion-side pass-through portion formed therein, the interposed portion-side pass-through portion facing the wall portion-side pass-through portion, the interposed portion-side pass-through portion receiving the pivot shaft passed therethrough, and
the interposed portion has a non-pass-through portion formed therein at least at a middle portion in the vehicle width direction of the interposed portion, the non-pass-through portion not receiving the pivot shaft,
wherein
the pivot shaft includes:
a first pivot shaft, and
a second pivot shaft that is spaced away from the first pivot shaft in the vehicle width direction and disposed coaxially with the first pivot shaft; and
the wall portion-side pass-through portion includes:
a first wall portion-side pass-through portion formed in one of the wall portions, the first wall portion-side pass-through portion receiving the first pivot shaft passed therethrough, and
a second wall portion-side pass-through portion formed in the other of the wall portions, the second wall portion-side pass-through portion receiving the second pivot shaft passed therethrough; and
the interposed portion-side pass-through portion includes:
a first interposed portion-side pass-through portion formed in the end portion of the interposed portion and facing the first wall portion-side pass-through portion, the first interposed portion-side pass-through portion receiving the first pivot shaft passed therethrough, and
a second interposed portion-side pass-through portion formed in an opposite end portion of the interposed portion in the vehicle width direction and facing the second wall portion-side pass-through portion, the second interposed portion-side pass-through portion receiving the second pivot shaft passed therethrough; and
a gap is formed between the second wall portion-side pass-through portion and the second interposed portion-side pass-through portion in the vehicle width direction, the pap allowing the interposed portion to be moved in the vehicle width direction.

2. The swing arm structure for a saddle riding vehicle according to claim 1, wherein
the wall portions are disposed in the vehicle body frame,
the interposed portion is disposed in the swing arm,
the interposed portion has an interposed portion-side pass-through portion forming portion in which the interposed portion-side pass-through portion is formed,
the pivot shaft is rotatably supported by a bearing disposed between the pivot shaft and the interposed portion-side pass-through portion forming portion,
one of an inner ring and an outer ring that constitute the bearing is fixed to one of the pivot shaft and the interposed portion-side pass-through portion forming portion, and
the other of the inner ring and the outer ring is fixed to the other of the pivot shaft and the interposed portion-side pass-through portion forming portion.

3. The swing arm structure for a saddle riding vehicle according to claim 2, further comprising:
a nut member threadedly engageable with the pivot shaft, wherein
the nut member is disposed in a hollow portion that forms the interposed portion-side pass-through portion in the swing arm,
the inner ring is fixed through threaded engagement of the nut member with the pivot shaft, and
the outer ring is fixed to the interposed portion-side pass-through portion forming portion.

4. The swing arm structure for a saddle riding vehicle according to claim 3, wherein the nut member threadedly engages the first pivot shaft, and the nut member does not threadedly engage the second pivot shaft.

5. The swing arm structure for a saddle riding vehicle according to claim 4, further comprising:
a drive shaft that transmits an output from an engine disposed anterior to the pivot shaft to a rear wheel, wherein
the drive shaft is disposed at a position at which the drive shaft crosses an axis of the pivot shaft on a side of the swing arm facing the second wall portion-side pass-through portion.

6. The swing arm structure for a saddle riding vehicle according to claim 5, further comprising:
a cylindrical collar that is passed over the pivot shaft at a position opposed to the nut member across the bearing, wherein the inner ring is fixed between the nut member and the collar through threaded engagement of the nut member with the pivot shaft.

7. The swing arm structure for a saddle riding vehicle according to claim 4, further comprising:
a cylindrical collar that is passed over the pivot shaft at a position opposed to the nut member across the bearing, wherein
the inner ring is fixed between the nut member and the collar through threaded engagement of the nut member with the pivot shaft.

8. The swing arm structure for a saddle riding vehicle according to claim 3, further comprising:
a cylindrical collar that is passed over the pivot shaft at a position opposed to the nut member across the bearing, wherein
the inner ring is fixed between the nut member and the collar through threaded engagement of the nut member with the pivot shaft.

9. The swing arm structure for a saddle riding vehicle according to claim 2, further comprising:
a nut member threadedly engageable with the pivot shaft; and
a cylindrical collar that is passed over the pivot shaft at a position opposed to the nut member across the bearing, wherein
the nut member is disposed in a hollow portion that forms the interposed portion-side pass-through portion in the swing arm,
the inner ring is fixed between the nut member and the collar through threaded engagement of the nut member with the pivot shaft, and
the outer ring is fixed to the interposed portion-side pass-through portion forming portion.

10. The swing arm structure for a saddle riding vehicle according to claim 9, further comprising:
a sealing member disposed on an outer peripheral side of the collar, the sealing member sealing a space defined between an outer peripheral surface of the collar and the interposed portion-side pass-through portion forming portion.

11. The swing arm structure for a saddle riding vehicle according to claim 10, wherein
the nut member includes:
an internal thread portion threadedly engageable with the pivot shaft,
a cylinder portion having an outer peripheral surface press-fitted into an inner peripheral surface of the inner ring, and
an enlarged diameter portion having a diameter enlarged outwardly in a radial direction with respect to the cylinder portion and an abutment surface that abuts on a side surface in the vehicle width direction of the inner ring.

12. The swing arm structure for a saddle riding vehicle according to claim 10, wherein
the nut member further includes a tool engagement portion that receives a tool to be engaged therewith during threaded engagement with the pivot shaft, and
the interposed portion-side pass-through portion forming portion has a tool pass-through hole formed therein, the tool pass-through hole providing communication between the hollow portion and an outside and allowing the tool to be passed therethrough.

13. The swing arm structure for a saddle riding vehicle according to claim 9, wherein
the nut member includes:
an internal thread portion threadedly engageable with the pivot shaft,
a cylinder portion having an outer peripheral surface press-fitted into an inner peripheral surface of the inner ring, and
an enlarged diameter portion having a diameter enlarged outwardly in a radial direction with respect to the cylinder portion and an abutment surface that abuts on a side surface in the vehicle width direction of the inner ring.

14. The swing arm structure for a saddle riding vehicle according to claim 13, wherein
the nut member further includes a tool engagement portion that receives a tool to be engaged therewith during threaded engagement with the pivot shaft, and
the interposed portion-side pass-through portion forming portion has a tool pass-through hole formed therein, the tool pass-through hole providing communication between the hollow portion and an outside and allowing the tool to be passed therethrough.

15. The swing arm structure for a saddle riding vehicle according to claim 9, wherein
the nut member further includes a tool engagement portion that receives a tool to be engaged therewith during threaded engagement with the pivot shaft, and
the interposed portion-side pass-through portion forming portion has a tool pass-through hole formed therein, the tool pass-through hole providing communication between the hollow portion and an outside and allowing the tool to be passed therethrough.

16. The swing arm structure for a saddle riding vehicle according to claim 1, further comprising:
a drive shaft that transmits an output from an engine disposed anterior to the pivot shaft to a rear wheel, wherein
the drive shaft is disposed at a position at which the drive shaft crosses an axis of the pivot shaft on a side of the swing arm facing the second wall portion-side pass-through portion.

* * * * *